United States Patent
Köhler et al.

(10) Patent No.: US 6,283,565 B1
(45) Date of Patent: Sep. 4, 2001

(54) ADJUSTABLE HINGE FOR A SWITCH CUPBOARD

(75) Inventors: Martina Köhler, Herborn; Markus Neuhof, Ehringshausen, both of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/445,306

(22) PCT Filed: Jun. 4, 1998

(86) PCT No.: PCT/EP98/03331

§ 371 Date: Dec. 6, 1999

§ 102(e) Date: Dec. 6, 1999

(87) PCT Pub. No.: WO98/55720

PCT Pub. Date: Dec. 10, 1998

(30) Foreign Application Priority Data

Jun. 5, 1997 (DE) .............................................. 197 23 555

(51) Int. Cl.[7] .................. A47B 47/00; E05D 7/10
(52) U.S. Cl. ................. 312/326; 312/265.1; 16/389
(58) Field of Search .................... 312/326, 329, 312/265.1, 265.2, 265.3, 265.4, 265.6, 265.5; 16/389

(56) References Cited

U.S. PATENT DOCUMENTS

| | | | |
|---|---|---|---|
| 2,408,071 | 9/1946 | Jahn | 16/237 |
| 2,587,818 * | 3/1952 | Caldwell et al. | 16/389 |
| 2,624,067 * | 1/1953 | Tassell | 16/389 |
| 5,355,559 * | 10/1994 | Bowers et al. | 16/389 |

FOREIGN PATENT DOCUMENTS

| | | |
|---|---|---|
| 286 632 | 5/1914 | (DE). |
| 295 076 001 U1 | 5/1996 | (DE). |
| 197 11 636 A1 | 11/1997 | (DE). |
| 0 157 344 | 10/1985 | (EP). |
| 2122679 | 1/1984 | (GB). |

* cited by examiner

*Primary Examiner*—Peter R. Brown
*Assistant Examiner*—James O. Hansen
(74) *Attorney, Agent, or Firm*—Pauley Petersen Kinne & Fejer

(57) ABSTRACT

A hinge for a switch cupboard, having a first hinge part and a second hinge part. The first hinge part is arranged on a cupboard door and the second hinge part is arranged on the body of the switch cupboard. The hinge can be used on both left-mounted and right-mounted cupboard doors and has two fixing positions. Thus, the cupboard doors can be fixed to the body in two different positions at a distance from each other in the axial direction of the hinge.

6 Claims, 3 Drawing Sheets

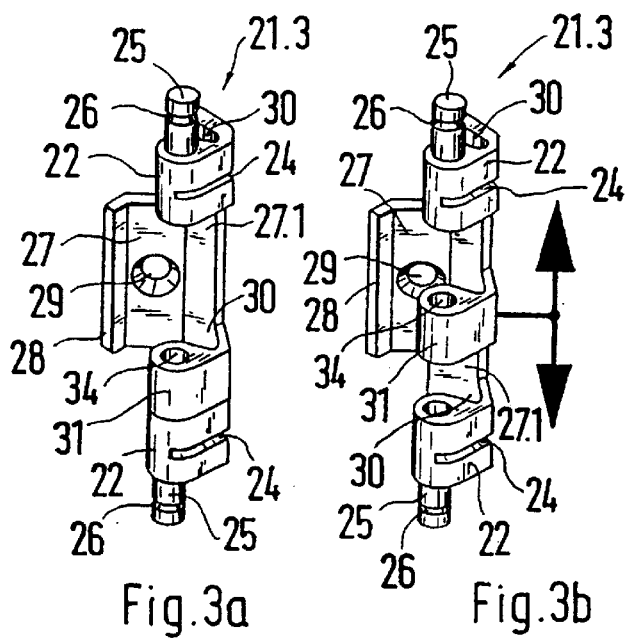
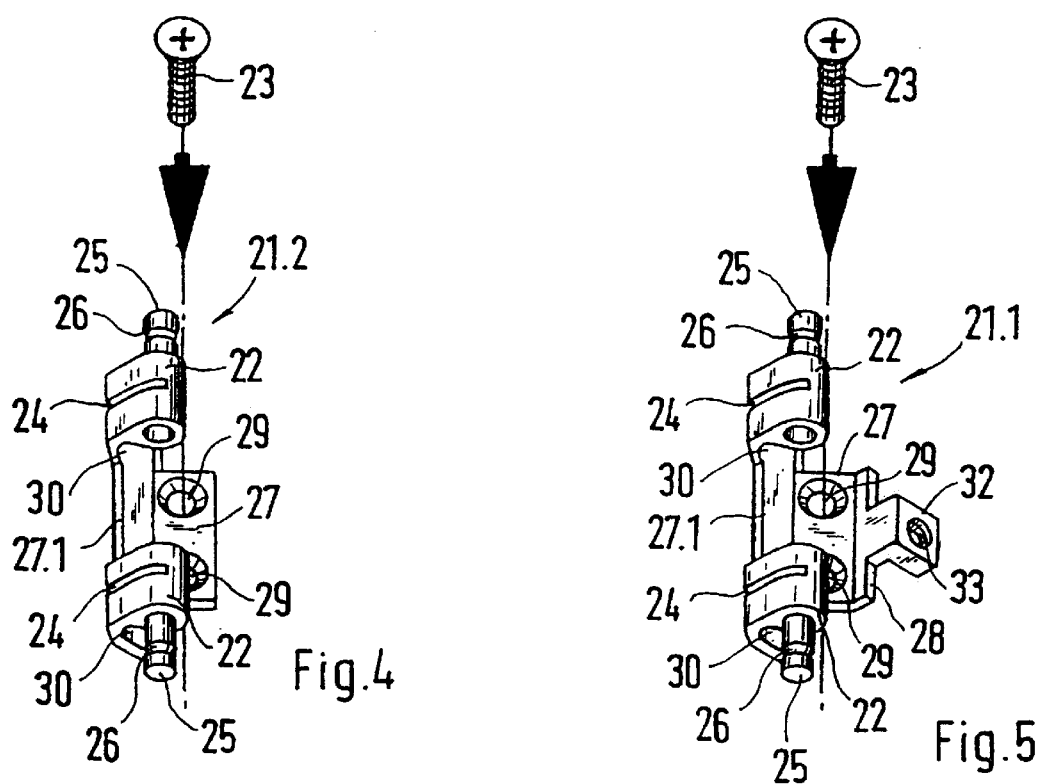

ADJUSTABLE HINGE FOR A SWITCH CUPBOARD

BACKGROUND OF THE INVENTION

1. Field of the Invention

This invention relates to a hinge for a switchgear cabinet having a first binge element, which is attached to the cabinet door, and a second hinge element arranged on the body of the switchgear cabinet.

2. Description of Prior Art

Similar hinges are known from European Patent Reference EP 01 57 344 B1 and are applied to one side of the switchgear cabinet. Depending on the spatial requirements, the cabinet door must be selectively attachable to the right or the left of the switchgear cabinet. The hinges are attached symmetrically relative to the center plane of the switchgear cabinet, which extends transversely in relation to the hinge axis. The cabinet door covers almost all of the front of the switchgear cabinet. A gap remains only in a bottom area, so that the cabinet door does not rest on the bottom. Because of this gap, the center axis of the cabinet door, which extends transversely relative to the hinge axis, is arranged offset with respect to the center plane of the switchgear cabinet. Because of these symmetry conditions it is not possible to change the cabinet door easily between being fastened on the left and fastened on the right. Instead, the hinges have to be exchanged. However, this requires a large outlay of parts.

SUMMARY OF THE INVENTION

It is one object of this invention to provide a hinge of the type mentioned at the outset, which can be used with a cabinet door fastened on the right, as well as on the left.

This object is attained with a hinge that has two holding positions, which allows the fixing in place of the cabinet door on the body in two positions, which are distanced from each other in the axial direction of the hinge.

Depending on the selected fastening type, the cabinet door can be fastened either in the first holding position or the second holding position. Thus, the hinge itself compensates for the symmetry conditions possible. Therefore the use of additional hinges or extensive modification measures are no longer required.

In a preferred embodiment of this invention the holding positions are offset with respect to each other in the axial direction of the body by twice the amount corresponding to the distance of the center plane of the body from the center axis of the cabinet door. This measure assures that the cabinet door can be mounted at the same height with either the left fastening or the right fastening.

In a possible variation of this invention the first hinge element is fastened firmly on the cabinet door or the body of the switchgear cabinet, and the second hinge element has two fastening receptacles determining the holding positions, by which the second hinge element can be fastened on the body, or respectively on the cabinet door.

In this case the fastenings are designed as bores cut into a holder, and the body, or respectively the cabinet door, has screw receptacles which can be aligned with the bores. A height compensation in the direction of the hinge axes can therefore be accomplished by the offset fastening possibilities alone. In another compensation possibility the hinge elements can be displaced with respect to each other in the axial direction of the hinge. It is thus possible to assure symmetry compensation by a displacement of both hinge elements with respect to each other within the hinge.

In this case, for example, one of the hinge elements can have two seating receptacles for receiving one hinge bolt or two hinge bolts. The seating receptacles are distanced from each other in the axial direction of the hinge. The other hinge element has a seating opening, which is maintained between the seating receptacles by means of the hinge bolt or bolts, and the seating opening can be displaced in the axial direction of the hinge between the two seating receptacles.

A spacer element, which is held between the two seating receptacles, can be used in order to fix the seating opening in place in the respective holding position.

The side of a switchgear cabinet which adjoins the hinge side is customarily covered by a wall element. If a holder for the side wall is attached to the second hinge element fastened on the body, no additional fastening elements are required. It is possible to reduce the parts expenditure by this embodiment.

BRIEF DESCRIPTION OF THE DRAWINGS

This invention will be described in greater detail in what follows by means of exemplary embodiments represented in the drawings wherein:

FIGS. 3a and b is each a perspective view of a hinge for attachment of the cabinet door to the switchgear cabinet;

FIG. 4 is a schematic view of one embodiment of a hinge which is different from the ges shown in FIGS. 3a and 3b; and FIG. 5 is a schematic view of a further embodiment of the hinge shown in FIG. 4.

DESCRIPTION OF PREFERRED EMBODIMENTS

Figure 1:
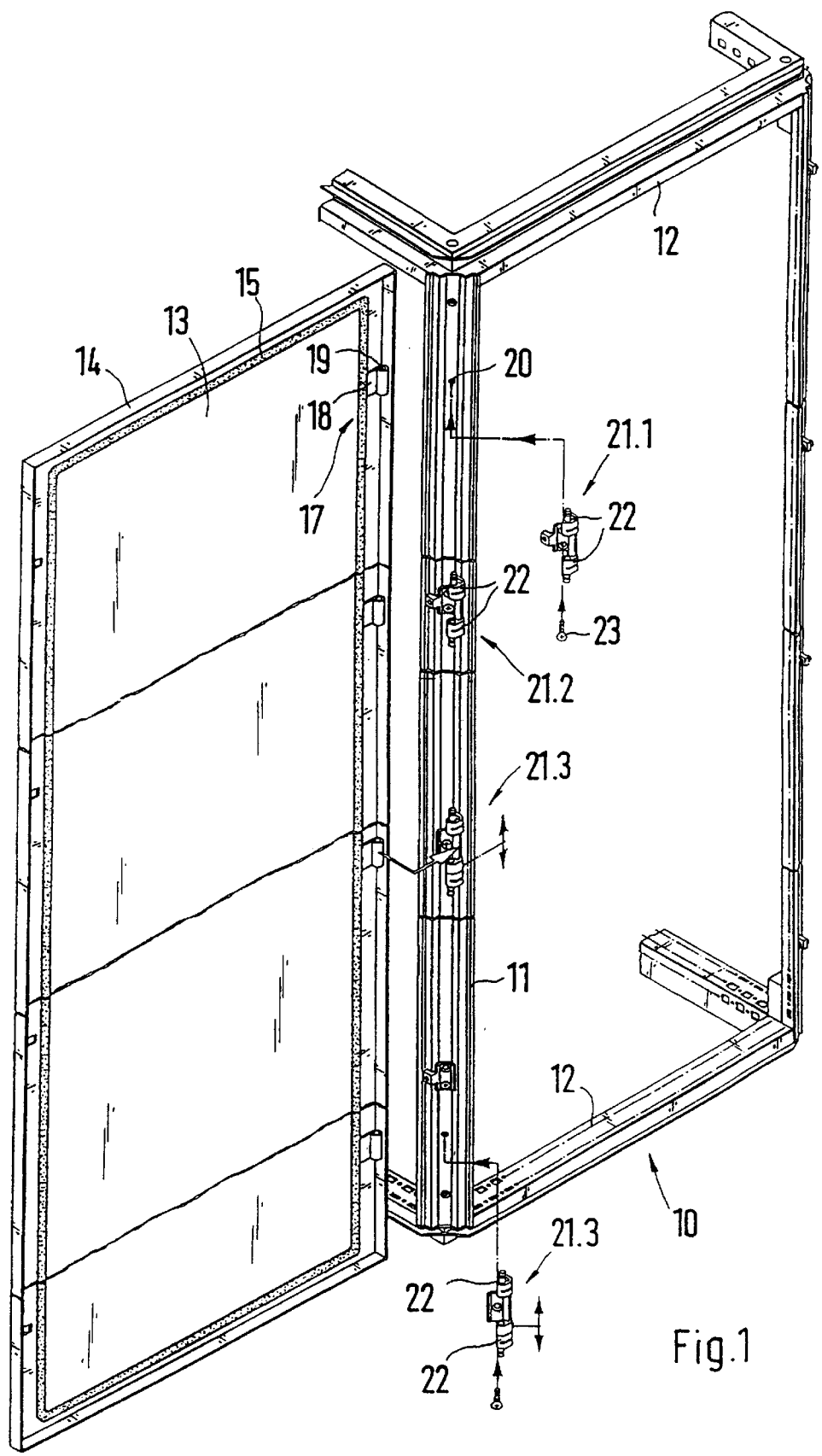
FIG. 1 is a perspective exploded view of a rack for a switchgear cabinet and a cabinet door.

The body 10 of a switchgear cabinet, which is embodied as a rack, is shown in FIG. 1. This rack is formed by a vertical profiled frame section 11 and a horizontal profiled frame section 12. A cabinet door 13 can be hinged to the left vertical profiled frame section 11. A circumferential seal 15 is applied to an inside of the cabinet door 13 and provides sealing on the profiled frame sections 11, 12.

Four hinges are shown in FIG. 1 for hinging the cabinet door 13 on the body 10. Different hinges in accordance with this invention are shown for demonstration purposes. However, customarily the same hinges are employed. The design of the individual hinges are addressed in detail later in the explanation of FIGS. 3 to 5.

The cabinet door 13 can be hinged on the left as well as on the right on the body 10.

Figure 2:
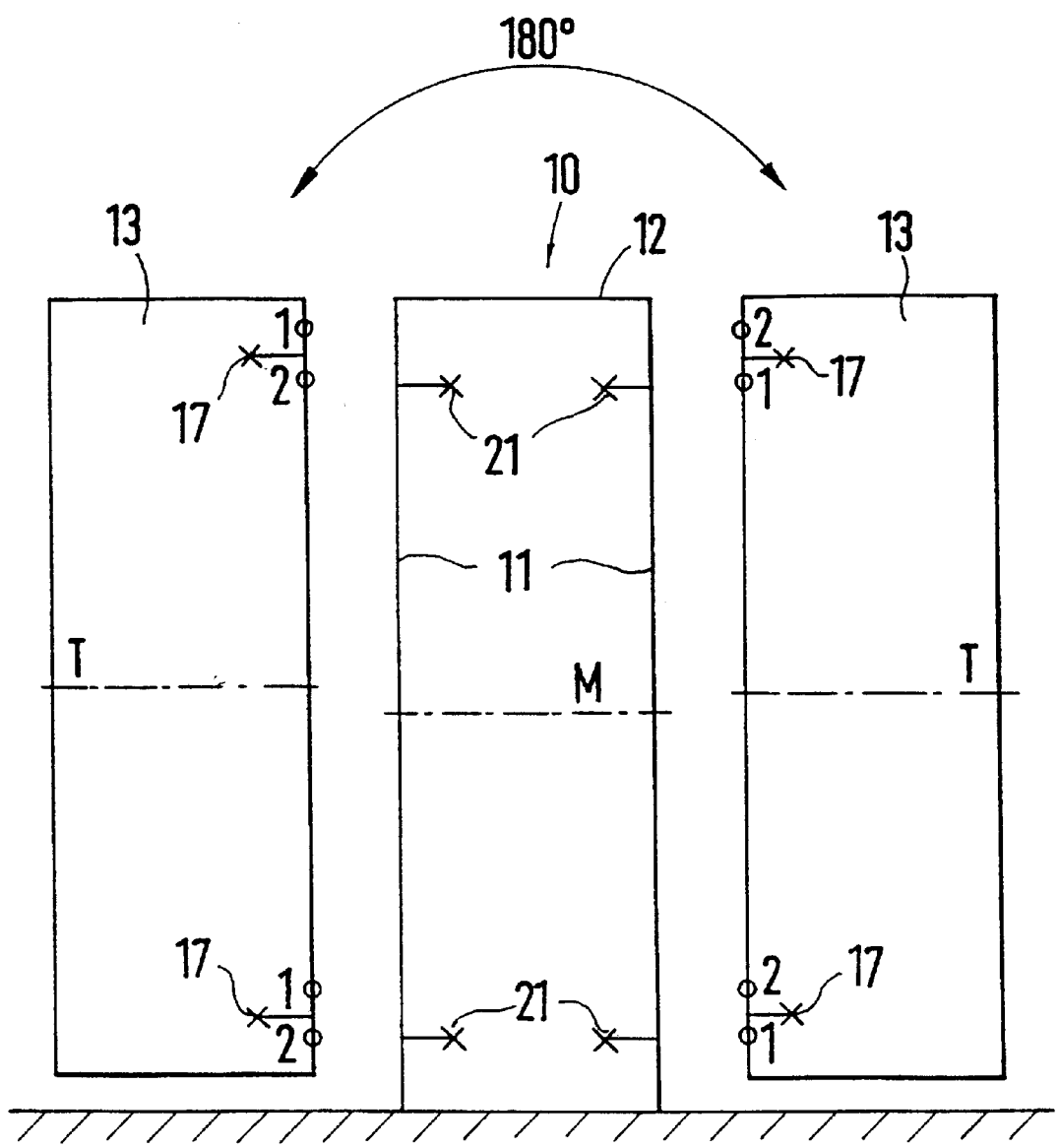
FIG. 2 is a schematic front view of a switchgear cabinet and two cabinet doors.

The two hinging possibilities are schematically shown in FIG. 2. As can be seen from this representation, first hinge elements 21 of the hinges are arranged symmetrically in relation to a center plane M of the switchgear cabinet, which extends transversely relative to the hinge axis. In contrast thereto, second hinge elements 17 of the hinge are fixed on the cabinet door 13 symmetrically relative to the plane of symmetry of the cabinet door 13, which extends transversely to the hinge axis. The points of fixation on the cabinet door 13, as well as on the switchgear cabinet, are marked by crosses. So that the cabinet door 13 can be pivoted open and closed without hindrance, a free space is positioned between the horizontal bottom edge of the cabinet door 13 and the floor. Because of this free space the cabinet door 13 has a lesser height than the switchgear cabinet itself. Because of these symmetry conditions, the center plane M of the switchgear cabinet is arranged offset relative to the axis of symmetry of the cabinet door 13.

Each second hinge element 17 has two holding positions, which are identified in FIG. 2 by the numbers 1 and 2. For hinging the cabinet door 13, represented on the left, on the left side of the switchgear cabinet, the second hinge 17 is attached in the holding position 2.

If now a change of the type of fastening is to be performed, the cabinet door 13 is brought, pivoted by 180°, to the right side of the switchgear cabinet. This manner of proceeding is represented by the two-headed arrow in FIG. 2. In order to be able to maintain the symmetry conditions, the other holding position 1 of the second hinge element 17 is used. The cabinet door 13 is fastened on the first hinge element 21.

The two holding positions 1 and 2 can be realized in different ways. Some possible variations are represented in FIGS. 3 to 5.

FIG. 3a shows a hinge element 21.3, which can be attached either to the switchgear cabinet or on the cabinet door 13. For fastening, for example on the rack of a switchgear cabinet, a holder 27 is used, which has a fastening 29. In the present case a plate-like holder 27 has a through-bore as the fastening 29 is cut. A strip 28 is connected at an angle with respect to the holder 27. The holder 27 can be aligned on the body 10 of the switchgear cabinet by means of the strip 28. On the side facing away from the strip 28, the holder makes a transition into an angled portion 27.1. The angled portion 27.1 has two seating receptacles 22, which are arranged at a distance from each other. Each of the seating receptacles 22 receives a hinge bolt 25. The two hinge bolts 25 are kept aligned with each other in the seating receptacles 22. The center longitudinal axis of the hinge bolts 25 forms the hinge axis. Each of the hinge bolts 25 has two circumferential grooves 26. In the representation in accordance with FIG. 3a, only one of the circumferential grooves 26 is visible and the other is concealed by the seating receptacle 22. A spring is maintained in a spring receptacle 24 of the seating receptacle 22 and the spring snaps into the groove 26, which is not visible.

A spacer element 31 is arranged between the two bearing receptacles 22. The remaining free space between the two seating receptacles 22 can be filled by a seating opening 19 of the first hinge element 17, such as shown in FIG. 1. For fixing the seating opening 19, as well as the spacer element 31, between the two seating receptacles 22, the seating bolt 25 is pushed through a bore 34 of the spacer element 31 into the seating opening 19. In the inserted state the spring element of the seating receptacle 22 snaps together with the second circumferential groove 26 of the seating bolt 25.

As shown in FIG. 3b, the spacer element 31 can be displaced between the two seating receptacles 22 and can be brought from its first position, shown in FIG. 3a, into a second position, in which it rests against the upper seating receptacle 22. It is possible to realize the two holding positions 1 and 2, shown in FIG. 2, with the spacer element 31.

Customarily the hinge elements 21.3 are made of one piece. In this case the spacer element 31 can also be rigidly connected with the hinge element 21.3. The connection is made via a rated breaking point. The spacer element 31 can then be broken off and brought into the respective intended position.

A variation of a hinge element 21.3 is shown in FIG. 4, by means of which the two different holding positions 1 and 2 can be realized. In its function, the hinge element 21.2 is essentially similar to the hinge elements 21.3 as described in connection with FIGS. 3a and 3b. One difference is that the seating receptacles 22 are distanced from each other only sufficiently far so that the seating opening 19 has room. Two fastenings 29, such as through-bores, are cut into the holder 21. The two fastenings 29 are distanced from each other in the direction of the hinge axis, so that two holding positions 1 and 2 are formed. It is thus possible to fasten the cabinet door 13 on the body 10 in two spaced-apart positions.

FIG. 5 shows a hinge element 21.1, which is a further development of the hinge element 21.2 in accordance with FIG. 4. A strip 28 is accordingly formed on the holder 27, by means of which the holder 27 can be aligned in turn on the switchboard cabinet. The strip 28 has a lateral wall holder 32. The lateral wall holder 32 has a threaded receptacle, to which a lateral wall can be screwed.

While forming a free space 30, the hinge elements 21.1, 21.2, 21.3 hold the seating receptacles 22 offset with respect to the angled portion 27.1. With the cabinet door pivoted open, a circumferential bevel 14 of the cabinet door 13 can be received in the free space 30. The bevel 14 is shown in FIG. 1. In this way the free space 30 assures that the cabinet door 13 is sufficiently pivoted open.

Fixing in place the hinge elements 21.1, 21.2, 21.3 represented in FIGS. 3a to 5 can be accomplished by means of fastening screws 23, which are conducted through fastenings 29 and can be screwed into fastening receptacles 20 of the body as shown in FIG. 1.

What is claimed is:

1. In a switchgear cabinet with a body (10) comprising horizontal profiled sections (12) connected to vertical profiled sections (11) constructed for receiving wall members and door members, and with a hinge having a first hinge element (17) which is attached to a cabinet door (13) and having a second hinge element (21) arranged on the body of the switchgear cabinet at one of the vertical profiled sections, the improvement comprising:

the hinge having two preselected holding positions for fixing in place the cabinet door (13) on the body (10) in first and second positions, the first position being for a right hand opening of the cabinet door on a first vertical profiled section and the second position being for a left hand opening of the door on a second vertical profiled section, the first and second positions distanced from each other in an axial direction of the hinge;

the holding positions being offset with respect to each other in the axial direction of the body by twice an amount corresponding to a distance of a center plane (M) of the body (10) from a center axis of the cabinet door (13) extending transversely with respect to a hinge axis;

the hinge elements (17, 21) displaced with respect to each other in an axial direction of the hinge; and a spacer element (31) positioned between the two seating receptacles (25) and the seating opening (19) of the hinge elements (21, 17).

2. In the switchgear cabinet in accordance with claim 1, wherein the first hinge element (17) is fastened firmly on on of the cabinet door (13) and the body (10) of the switchgear cabinet, and the second hinge element (21) has two fastenings (29) determining the two holding positions by which the second hinge element (21) can be fastened on one of the body (10) and the cabinet door (13).

3. In the switchgear cabinet in accordance with claim 2, wherein the fastenings (29) are designed as bores within a holder (27), and the body (10) has screw receptacles aligned with the bores.

4. In the switchgear cabinet in accordance with claim 1, wherein the second hinge element (21, 21.1, 21.2, 21.3) is fastened on the body (10) and has a lateral wall holder (32) on which a wall element can be fastened.

5. In a switchgear cabinet with a body (10) comprising horizontal profiled sections (12) connected to vertical profiled sections (11) constructed for receiving wall members and door members, and with a hinge having a first hinge element (17) which is attached to a cabinet door (13) and having a second hinge element (21) arranged on the body of the switchgear cabinet at one of the vertical profiled sections, the improvement comprising:

the hinge having two preselected holding positions for fixing in place the cabinet door (13) on the body (10) in first and second positions, the first position being for a right hand opening of the cabinet door on a first vertical profiled section and the second position being for a left hand opening of the door on a second vertical profiled section, the first and second positions distanced from each other in an axial direction of the hinge, the holding positions being offset with respect to each other in the axial direction of the body by twice an amount corresponding to a distance of a center plane (M) of the body (10) from a center axis of the cabinet door (13) extending transversely with respect to a hinge axis, the hinge elements (17, 21) displaced with respect to each other in an axial direction of the hinge, one of the hinge elements (17, 21) having two seating receptacles (22) for receiving at least one hinge bolt (25), the seating receptacles (22) distanced from each other in the axial direction of the hinge, the other of the hinge elements (21, 17) having a seating opening (19) maintained between the seating receptacles (22) by the at least one hinge bolt (25), and the seating opening (19) displaced in the axial direction of the hinge between the two seating receptacles (25).

6. In the switchgear cabinet in accordance with claim 5, wherein the second hinge element (21, 21.1, 21.2, 21.3) is fastened on the body (10) and has a lateral wall holder (32) on which a wall element can be fastened.

* * * * *